United States Patent
Erle et al.

(10) Patent No.: US 9,836,450 B2
(45) Date of Patent: Dec. 5, 2017

(54) METHODS AND SYSTEMS FOR PROVIDING UNIVERSAL PORTABILITY IN MACHINE LEARNING

(71) Applicant: Idibon, Inc., San Francisco, CA (US)

(72) Inventors: Schuyler D. Erle, San Francisco, CA (US); Robert J. Munro, San Francisco, CA (US); Brendan D. Callahan, Philadelphia, PA (US); Gary C. King, Los Altos, CA (US); Jason Brenier, Oakland, CA (US); James B. Robinson, San Francisco, CA (US)

(73) Assignee: Sansa AI Inc., San Francisco, CA (US)

( * ) Notice: Subject to any disclaimer, the term of this patent is extended or adjusted under 35 U.S.C. 154(b) by 0 days.

(21) Appl. No.: 14/964,526

(22) Filed: Dec. 9, 2015

(65) Prior Publication Data

US 2016/0162468 A1   Jun. 9, 2016

Related U.S. Application Data

(60) Provisional application No. 62/089,736, filed on Dec. 9, 2014, provisional application No. 62/089,742, filed on Dec. 9, 2014, provisional application No. 62/089,745, filed on Dec. 9, 2014, provisional application No. 62/089,747, filed on Dec. 9, 2014, provisional application No. 62/167,078, filed on May 27, 2015.

(51) Int. Cl.
*G06F 17/27*   (2006.01)
*G06F 17/24*   (2006.01)

(52) U.S. Cl.
CPC .......... *G06F 17/277* (2013.01); *G06F 17/241* (2013.01); *G06F 17/2785* (2013.01)

(58) Field of Classification Search
None
See application file for complete search history.

(56) References Cited

U.S. PATENT DOCUMENTS

| | | | |
|---|---|---|---|
| 2003/0110033 A1* | 6/2003 | Sheikhzadeh-Nadjar | G10L 15/34 704/243 |
| 2014/0280353 A1* | 9/2014 | Delaney | G06F 17/30734 707/794 |
| 2015/0019204 A1* | 1/2015 | Simard | G06F 17/2785 704/9 |
| 2015/0120755 A1* | 4/2015 | Burger | G06Q 50/01 707/748 |
| 2015/0332673 A1* | 11/2015 | Li | G10L 15/1815 704/235 |
| 2015/0379072 A1* | 12/2015 | Dirac | G06F 9/00 707/693 |

* cited by examiner

*Primary Examiner* — Pierre-Louis Desir
*Assistant Examiner* — Jonathan Kim
(74) *Attorney, Agent, or Firm* — K&L Gates LLP; Jordan A. Kwan

(57) ABSTRACT

Systems, methods, and apparatuses are presented for a trained language model to be stored in an efficient manner such that the trained language model may be utilized in virtually any computing device to conduct natural language processing. Unlike other natural language processing engines that may be computationally intensive to the point of being capable of running only on high performance machines, the organization of the natural language models according to the present disclosures allows for natural language processing to be performed even on smaller devices, such as mobile devices.

17 Claims, 8 Drawing Sheets

| Feature Name | Description | Valid Tasks | Parameters |
|---|---|---|---|
| BagOfWords | Creates a feature for each token consisting of just the text in the token | Document | • strip_punctuation -ignores punctuation tokens<br>• case_insensitive -normalizes all token to lower case |
| NGrams | Creates a feature for each tuple of 2 – size adjacent tokens | Document | • strip_punctuation<br>• case_insensitive<br>• size-Maximum number of adjacent tokens to use |
| UnicodeRanges | Counts the number of code points in the document that fall in each unicode character range bucket, and creates a feature for every range with >=25% of the total document code points | Document | |
| WordShapes | Creates a feature for each token that describes the "shape" of the token (captures capitalization and interior digits / punctuation in the token) | Document | |
| SpanWords | Creates a feature for all possible N-Grams for the document tokens located within an annotated span. Any span which includes a partial token is expanded to include the full token. Tokens adjacent to the span may also be included | Document | • case_insensitive<br>• num_outside-Number of adjacent (outside) tokens to include in span |

FIG. 6

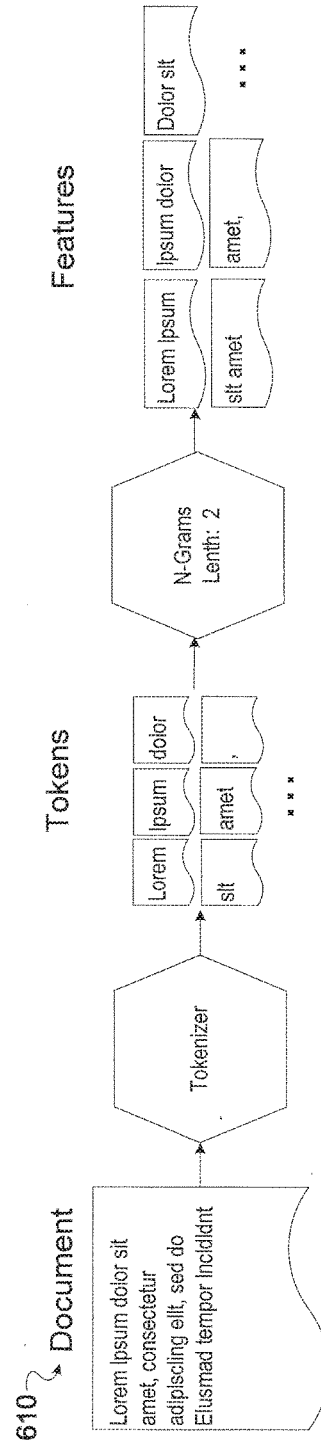

METHODS AND SYSTEMS FOR PROVIDING UNIVERSAL PORTABILITY IN MACHINE LEARNING

CROSS REFERENCES TO RELATED APPLICATIONS

This application claims the benefits of U.S. Provisional Application 62/089,736, filed Dec. 9, 2014, and titled, "METHODS AND SYSTEMS FOR ANNOTATING NATURAL LANGUAGE PROCESSING," U.S. Provisional Application 62/089,742, filed Dec. 9, 2014, and titled, "METHODS AND SYSTEMS FOR IMPROVING MACHINE PERFORMANCE IN NATURAL LANGUAGE PROCESSING," U.S. Provisional Application 62/089,745, filed Dec. 9, 2014, and titled, "METHODS AND SYSTEMS FOR IMPROVING FUNCTIONALITY IN NATURAL LANGUAGE PROCESSING," U.S. Provisional Application 62/089,747, filed Dec. 9, 2014, and titled, "METHODS AND SYSTEMS FOR SUPPORTING NATURAL LANGUAGE PROCESSING," and U.S. Provisional Application 62/167,078, filed May 27, 2015, and titled "METHODS AND SYSTEMS FOR PROVIDING UNIVERSAL PORTABILITY IN NATURAL LANGUAGE PROCESSING APPLICATIONS," the disclosures of which are incorporated herein in their entireties and for all purposes.

This application is also related to US non provisional applications U.S. patent application Ser. No. 14/964,517, files Dec. 9, 2015, and titled "METHODS FOR GENERATING NATURAL LANGUAGE PROCESSING SYSTEMS," U.S. patent application Ser. No. 14/964,518, filed Dec. 9, 2015, and titled "ARCHITECTURES FOR NATURAL LANGUAGE PROCESSING," U.S. patent application Ser. No. 14/964,520, filled Dec. 9, 2015, and titled "OPTIMIZATION TECHNIQUES FOR ARTIFICIAL INTELLIGENCE," U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," U.S. patent application Ser. No. 14/964,510, filed Dec. 9, 2015, and titled "METHODS AND SYSTEMS FOR IMPROVING MACHINE LEARNING PERFORMANCE," U.S. patent application Ser. No. 14/964,511, filed Dec. 9, 2015, and titled "METHODS AND SYSTEMS FOR MODELING COMPLEX TAXONOMIES WITH NATURAL LANGUAGE UNDERSTANDING," U.S. Patent Application No. 14/964,512, filed Dec. 9, 2015, and titled "AN INTELLIGENT SYSTEM THAT DYNAMICALLY IMPROVES ITS KNOWLEDGE AND CODEBASE FOR NATURAL LANGUAGE UNDERSTANDING," U.S. Patent Application No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION," and U.S. Patent Application No. 14/964,528, filed Dec. 9, 2015, and titled "TECHNIQUES FOR COMBINING HUMAN AND MACHINE LEARNING IN NATURAL LANGUAGE PROCESSING," each of which are filed concurrently herewith, and the entire contents and substance of all of which are hereby incorporated in total by reference in their entireties and for all purposes.

TECHNICAL FIELD

The subject matter disclosed herein generally relates to processing data. In some example embodiments, the present disclosures relate to systems and methods for providing universal portability in natural language processing applications.

BRIEF SUMMARY

In some embodiments, methods and systems for providing universal portability in natural language processing applications are presented. In some embodiments, a method is presented for classifying a document in natural language processing using a natural language model stored in a universally portable data file. The method may include: accessing one or more feature types from the data file, the one or more feature types each defining a data structure configured to access a tokenized sequence of the document and generate linguistic features from content within the tokenized sequence; performing a tokenizing operation of the document, the tokenizing operation configured to generate one or more tokenized sequences from the content within the document; generating a plurality of features for the document from the one or more tokenized sequences based on parameters defined by the one or more feature types; accessing a plurality of probabilities stored in the data file, each probability among the plurality of probabilities associated with a feature among the plurality of features and defining a pre-computed likelihood that said feature predicts a presence of absence of a label that the document is to be classified into; computing a prediction score indicating how likely the document is to be classified into said label, based on the plurality of probabilities; and classifying the document into said label based on comparing the prediction score to a threshold.

In some embodiments of the method, generating the plurality of features is further based on parameters defined in task configuration data in the data file, the task configuration data associated with a type of task analysis that the natural language model is configured to classify the document into.

In some embodiments of the method, the plurality of probabilities are pre-computed during a model training process configured to train the natural language model to classify documents according to at least said label and said task.

In some embodiments of the method, the plurality of probabilities comprise a first probability that said feature predicts the presence of said label and a second probability that said feature predicts the absence of said label.

In some embodiments of the method, the plurality of probabilities comprise a first probability that said feature appears at a beginning of a subset of the document, a second probability that said feature appears at an inside of the subset of the document, and a third probability that said feature appears on an outside of the subset of the document.

In some embodiments of the method, each feature among the generated plurality of features comprises a first array storing integer indices of every label in the natural language model having a non-zero probability.

In some embodiments of the method, each feature among the generated plurality of features further comprises a second array storing a quantized 16-bit fixed-point value of each probability converted as a logarithm.

In some embodiments of the method, generating the plurality of features is based further on task configuration data stored in the data file, the task configuration data including training feature types used to train the natural language model. In some embodiments, the task configuration data stored in the data file includes executable code configured perform a user-specified data transformation to generate custom feature types.

In some embodiments of the method, the task configuration data further comprises analyst-defined tuning rules.

In some embodiments, a natural language platform configured to classify a document in natural language processing using a natural language model stored in a universally portable data file is presented. the natural language platform may include: a memory configured to store the data file; and a processor coupled to the memory and configured to: access one or more feature types from the data file, the one or more feature types each defining a data structure configured to access a tokenized sequence of the document and generate linguistic features from content within the tokenized sequence; perform a tokenizing operation of the document, the tokenizing operation configured to generate one or more tokenized sequences from the content within the document; generate a plurality of features for the document from the one or more tokenized sequences based on parameters defined by the one or more feature types; access a plurality of probabilities stored in the data file, each probability among the plurality of probabilities associated with a feature among the plurality of features and defining a pre-computed likelihood that said feature predicts a presence of absence of a label that the document is to be classified into; compute a prediction score indicating how likely the document is to be classified into said label, based on the plurality of probabilities; and classify the document into said label based on comparing the prediction score to a threshold.

In some embodiments, a non-transitory computer-readable medium is presented embodying instructions that, when executed by a processor, perform operations comprising: accessing one or more feature types from the data file, the one or more feature types each defining a data structure configured to access a tokenized sequence of the document and generate linguistic features from content within the tokenized sequence; performing a tokenizing operation of the document, the tokenizing operation configured to generate one or more tokenized sequences from the content within the document; generating a plurality of features for the document from the one or more tokenized sequences based on parameters defined by the one or more feature types; accessing a plurality of probabilities stored in the data file, each probability among the plurality of probabilities associated with a feature among the plurality of features and defining a pre-computed likelihood that said feature predicts a presence of absence of a label that the document is to be classified into; computing a prediction score indicating how likely the document is to be classified into said label, based on the plurality of probabilities; and classifying the document into said label based on comparing the prediction score to a threshold.

BRIEF DESCRIPTION OF THE DRAWINGS

Some embodiments are illustrated by way of example and not limitation in the figures of the accompanying drawings.

FIG. 6 shows examples of feature types and how a document may be converted into a set of features, according to some embodiments.

DETAILED DESCRIPTION

Example methods, apparatuses, and systems (e.g., machines) are presented for performing natural language processing techniques using human annotations applied to machine learning techniques of natural language.

Aspects of the present disclosure are presented for operating complex natural language processing engines in computationally- and memory-efficient ways. A natural language processing engine may be configured to analyze and categorize thousands or even millions of human communications, and distill the results into various descriptions that humans can more easily digest. However, conventional natural language processing engines may require large amounts of resources to perform such tasks. Besides being inefficient, these limitations may disallow the conventional natural language processing programs to operate on smaller or more memory-strapped machines, such as mobile devices or more limited computers. On the other hand, the systems and methods of the present disclosure provide an efficient architecture to allow for natural language processing programs to be portable to virtually any machine of the present age, at least in part due to an efficient data storage of the natural language models used when loaded into the natural language processing engines.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
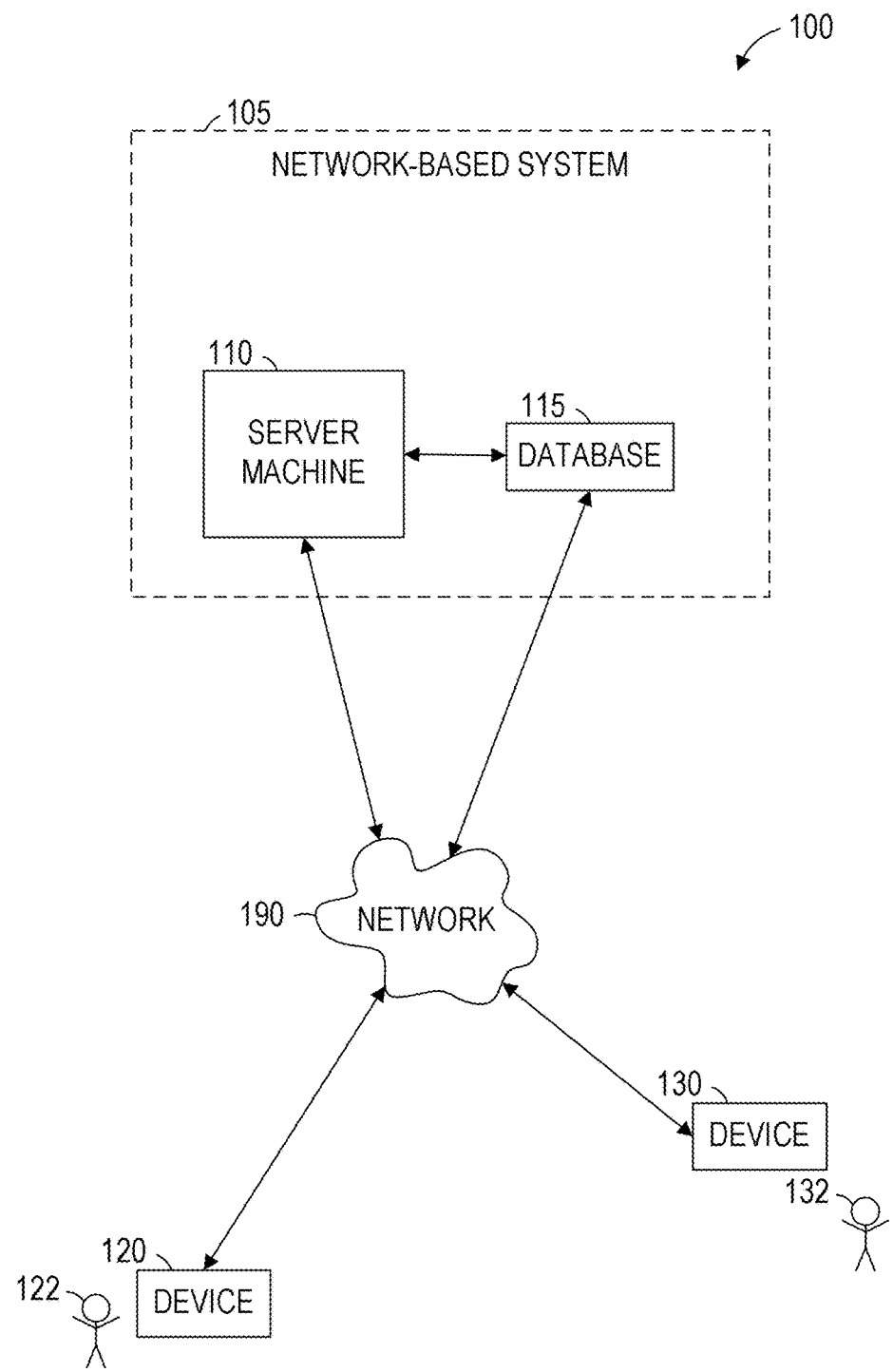
FIG. 1 is a network diagram illustrating an example network environment suitable for aspects of the present disclosure, according to some example embodiments.

Referring to FIG. 1, a network diagram illustrating an example network environment 100 suitable for performing aspects of the present disclosure is shown, according to some example embodiments. The example network environment 100 includes a server machine 110, a database 115, a first device 120 for a first user 122, and a second device 130 for a second user 132, all communicatively coupled to each other via a network 190. The server machine 110 may form all or part of a network-based system 105 (e.g., a cloud-based server system configured to provide one or more services to the first and second devices 120 and 130).

The server machine 110, the first device 120, and the second device 130 may each be implemented in a computer system, in whole or in part, as described below with respect to FIG. 8. The network-based system 105 may be an example of a natural language platform configured to generate natural language models as described herein. The server machine 110 and the database 115 may be components of the natural language platform configured to perform these functions. While the server machine 110 is represented as just a single machine and the database 115 where is represented as just a single database, in some embodiments, multiple server machines and multiple databases communicatively coupled in parallel or in serial may be utilized, and embodiments are not so limited.

Also shown in FIG. 1 are a first user 122 and a second user 132. One or both of the first and second users 122 and 132 may be a human user, a machine user (e.g., a computer configured by a software program to interact with the first device 120), or any suitable combination thereof (e.g., a human assisted by a machine or a machine supervised by a human). The first user 122 may be associated with the first device 120 and may be a user of the first device 120. For example, the first device 120 may be a desktop computer, a vehicle computer, a tablet computer, a navigational device, a portable media device, a smartphone, or a wearable device (e.g., a smart watch or smart glasses) belonging to the first user 122. Likewise, the second user 132 may be associated with the second device 130. As an example, the second device 130 may be a desktop computer, a vehicle computer, a tablet computer, a navigational device, a portable media device, a, smartphone, or a wearable device (e.g., a smart watch or smart glasses) belonging to the second user 132. The first user 122 and a second user 132 may be examples of users or customers interfacing with the network-based system 105 to utilize a natural language model according to their specific needs. In other cases, the users 122 and 132 may be examples of annotators who are supplying annotations to documents to be used for training purposes when developing a natural language model. In other cases, the users 122 and 132 may be examples of analysts who are providing inputs to the natural language platform to more efficiently train the natural language model. The users 122 and 132 may interface with the network-based system 105 through the devices 120 and 130, respectively.

Any of the machines, databases 115, or first or second devices 120 or 130 shown in FIG. 1 may be implemented in a general-purpose computer modified (e.g., configured or programmed) by software (e.g., one or more software modules) to be a special-purpose computer to perform one or more of the functions described herein for that machine, database 115, or first or second device 120 or 130. For example, a computer system able to implement any one or more of the methodologies described herein is discussed below with respect to FIG. 8. As used herein, a "database" may refer to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases 115, and devices (e.g., the server machine 110 and the first device 120). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
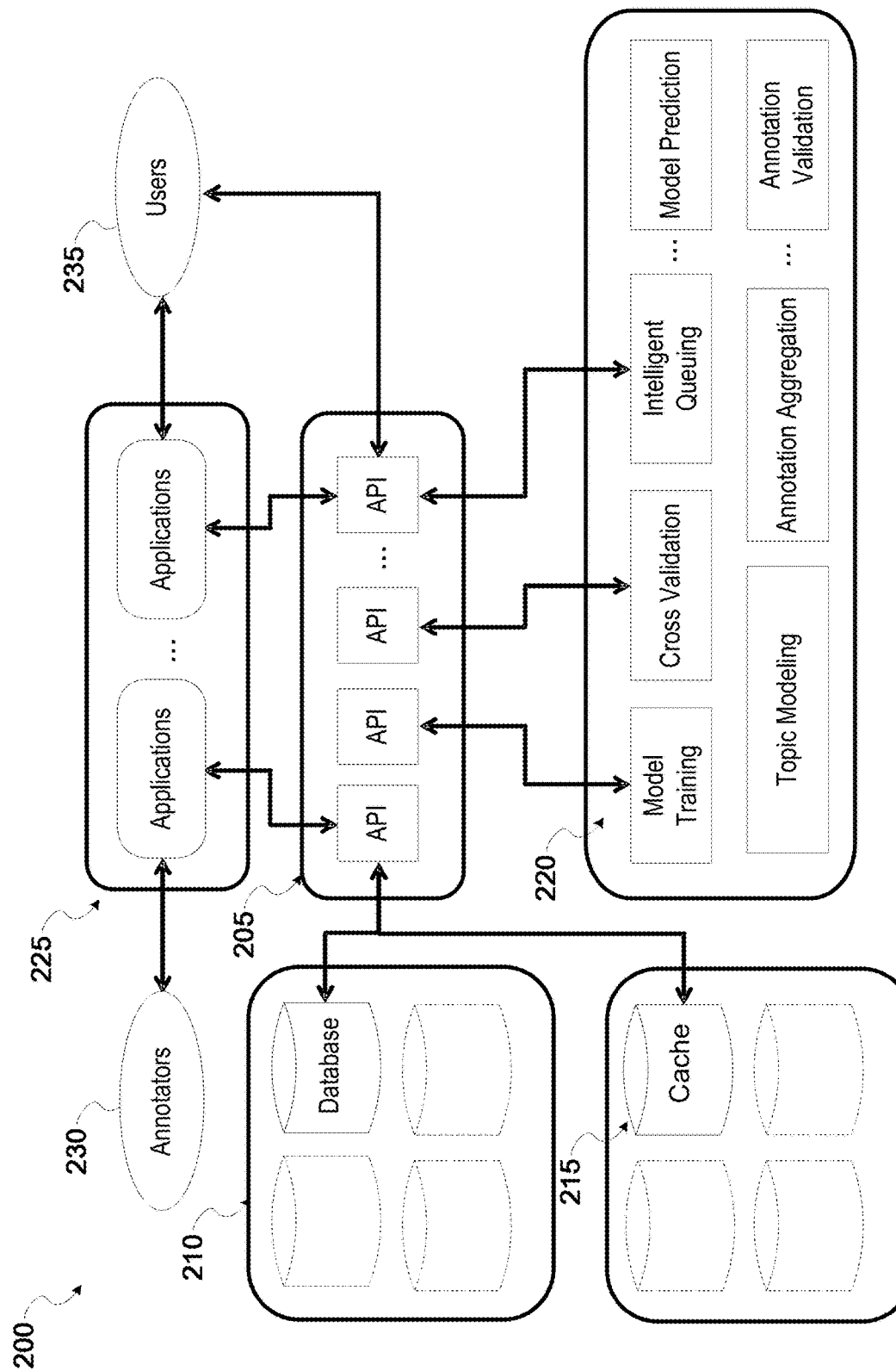
FIG. 2 is a block diagram showing an example system architecture for performing aspects of the present disclosure, according to some example embodiments

Referring to FIG. 2, a diagram 200 is presented showing an example system architecture for performing aspects of the present disclosure, according to some example embodiments. The example system architecture according to diagram 200 represents various data structures and their inter-relationships that may comprise a natural language platform, such as the natural language platform 170, or the network-based system 105. These various data structures may be implemented through a combination of hardware and software, the details of which may be apparent to those with skill in the art based on the descriptions of the various data structures described herein. For example, an API module 205 includes one or more API processors, where multiple API processors may be connected in parallel. In some example embodiments, the repeating boxes in the diagram 200 represent identical servers or machines, to signify that the system architecture in diagram 200 may be scalable to an arbitrary degree. The API module 205 may represent a point of contact for multiple other modules, includes a database module 210, a cache module 215, background processes module 220, applications module 225, and even an interface for users 235 in some example embodiments. The API module 205 may be configured to receive or access data from database module 210. The data may include digital forms of thousands or millions of human communications. The cache module 215 may store in more accessible memory various information from the database module 210 or from users 235 or other subscribers. Because the database module 210 and cache module 215 show accessibility through API module 205, the API module 205 can also support authentication and authorization of the data in these modules. The background module 220 may be configured to perform a number of background processes for aiding natural language processing functionality. Various examples of the background processes include a model training module, a cross validation module, an intelligent queuing module, a model prediction module, a topic modeling module, an annotation aggregation module, an annotation validation module, and a feature extraction module. These various modules are described in more detail below as well as in non-provisional applications U.S. patent application Ser. No. 14/964,520, filed Dec. 9, 2015, and titled "OPTIMIZATION TECHNIQUES FOR ARTIFICIAL INTELLIGENCE," U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE," U.S. patent application Ser. No. 14/964,510, filed Dec. 9, 2015, and titled "METHODS AND SYSTEMS FOR IMPROVING MACHINE LEARNING PERFORMANCE, " U.S. patent application Ser. No. 14/964,512, filed Dec. 9, 2015, and titled "AN INTELLIGENT SYSTEM THAT DYNAMICALLY IMPROVES ITS KNOWLEDGE AND CODE-BASE FOR NATURAL LANGUAGE UNDERSTANDING, " U.S. patent application Ser. No. 14/964,525, filed Dec. 9, 2015, and titled "METHODS AND SYSTEMS FOR LANGUAGE-AGNOSTIC MACHINE LEARNING IN NATURAL LANGUAGE PROCESSING USING FEATURE EXTRACTION, " and U.S. patent application Ser. No. 14/964,528, filed Dec. 9, 2015, and titled "TECHNIQUES FOR COMBINING HUMAN AND MACHINE LEARNING IN NATURAL LANGUAGE PROCESSING, " each of which are incorporated by reference in their entireties. The API module 205 may also be configured to support display and functionality of one or more applications in applications module 225.

In some embodiments, the API module 205 may be configured to provide as an output the natural language model packaged in a computationally- and memory-efficient manner. The natural language model may then be transmitted to multiple client devices, such as devices 120 and 130, including transmitting to mobile devices and other machines with less memory and less processing power.

Figure 3:
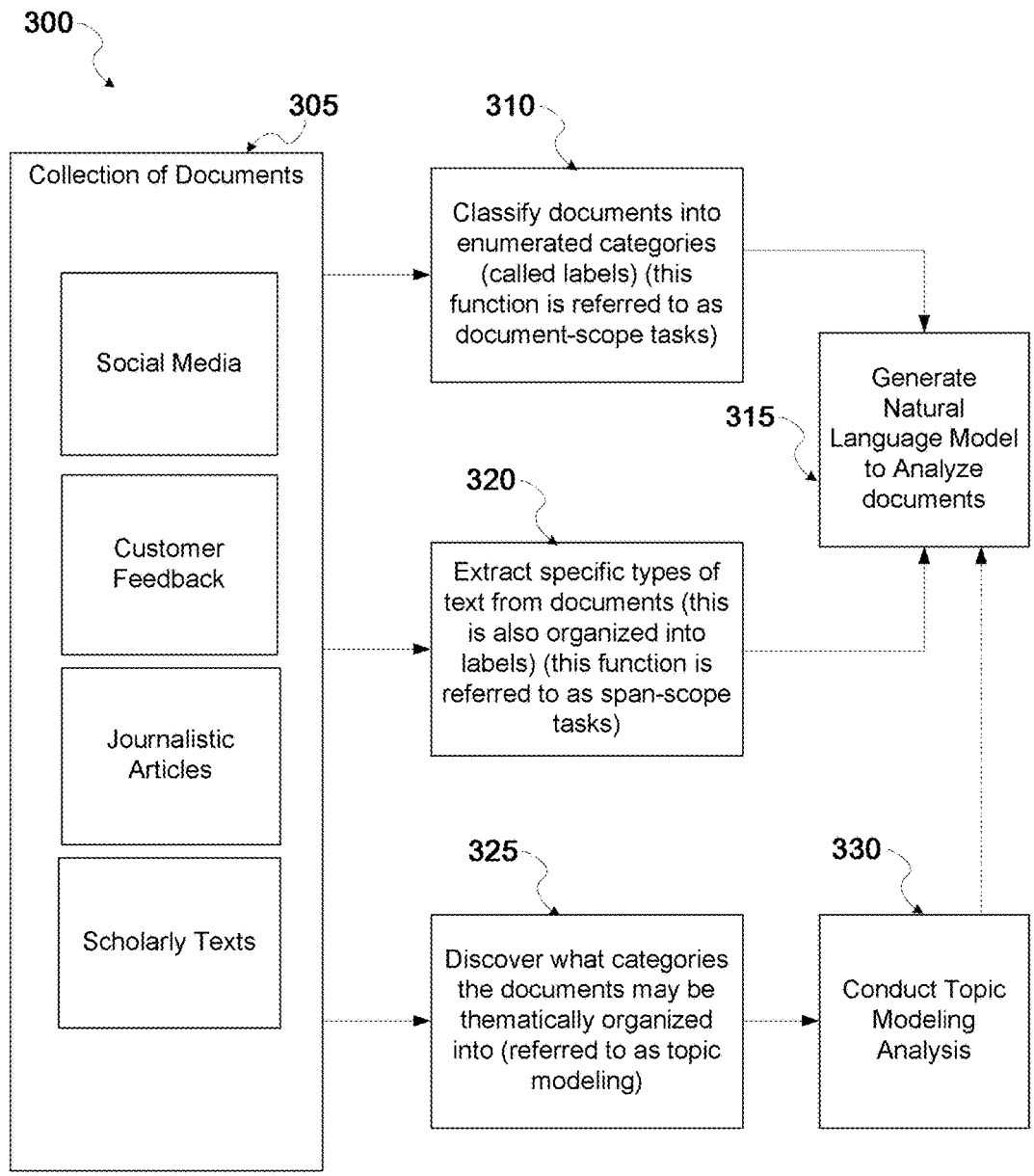
FIG. 3 is a high level diagram showing an example language modeling flow for how human communications are processed using a combination of machine learning techniques and human annotations, according to some example embodiments.

Referring to FIG. 3, a high level diagram 300 is presented showing various examples of types of human communications and what the objectives may be for a natural language model to accomplish. Here, various sources of data, sometimes referred to as a collection of documents 305, may be obtained and stored in, for example database 115, client data store 155, or database modules 210, and may represent different types of human communications, all capable of being analyzed by a natural language model. Examples of the types of documents 305 include, but are not limited to, posts in social media, emails or other writings for customer feedback, pieces of or whole journalistic articles, commands spoken or written to electronic devices, transcribed call center recordings; electronic (instant) messages; corporate communications (e.g., SEC 10-k, 10-q); confidential documents and communications stored on internal collaboration systems (e.g., SharePoint, Notes), and pieces of or whole scholarly texts.

In some embodiments, at block 310, it may be desired to classify any of the documents 305 into a number of enumerated categories or topics, consistent with some of the descriptions mentioned above. This may be referred to as performing a document-scope task. For example, a user 130 in telecommunications may supply thousands of customer service emails related to services provided by a telecommunications company. The user 130 may desire to have a natural language model generated that classifies the emails into predetermined categories, such as negative sentiment about their Internet service, positive sentiment about their Internet service, negative sentiment about their cable service, and positive sentiment about their cable service. As previously mentioned, these various categories for which a natural language model may classify the emails into, e.g. "negative" sentiment about "Internet service," "positive" sentiment about "Internet service," "negative" sentiment about "cable service," etc., may be referred to as "labels." Based on these objectives, at block 315, a natural language model may be generated that is tailored to classify these types of emails into these types of labels.

As another example, in some embodiments, at block 320, it may be desired to extract specific subsets of text from documents, consistent with some of the descriptions mentioned above. This may be another example of performing a span-scope task, in reference to the fact that this function focuses on a subset within each document (as previously mentioned, referred to herein as a "span"). For example, a user 130 may desire to identify all instances of a keyword, key phrase, or general subject matter within a novel. Certainly, this span scope task may be applied to multiple novels or other documents. Another example includes a company that may want to extract phrases that correspond to products or product features (e.g., "iPhone 5" or "battery life"). Here too, based on this objective, at block 315, a natural language model may be generated that is tailored to perform this function for a specified number of documents.

As another example, in some embodiments, at block 325, it may be desired to discover what categories the documents may be thematically or topically organized into in the first place, consistent with descriptions above about topic modeling. In some cases, the user 130 may utilize the natural language platform only to perform topic modeling and to discover what topics are most discussed in a specified collection of documents 305. To this end, the natural language platform may be configured to conduct topic modeling analysis at block 330. Topic modeling is discussed in more detail below, as well as in applications U.S. patent application Ser. No. 14/964,520, filed Dec. 9, 2015, and titled "OPTIMIZATION TECHNIQUES FOR ARTIFICAL INTELLIGENCE, " U.S. patent application Ser. No. 14/964,522, filed Dec. 9, 2015, and titled "GRAPHICAL SYSTEMS AND METHODS FOR HUMAN-IN-THE-LOOP MACHINE INTELLIGENCE, " U.S. patent application Ser. No. 14/964,511, filed Dec. 9, 2015, and titled "METHODS AND SYSTEMS FOR MODELING COMPLEX TAXONOMIES WITH NATURAL LANGUAGE UNDERSTANDING, " and U.S. patent application Ser. No. 14/964,528, filed Dec. 9, 2015, and titled "TECHINQUES FOR COMBINING HUMAN AND MACHINE LEARNING IN NATURAL LANGUAGE PROCESSING, " each of which are incorporated herein by reference in their entireties. In some cases, it may be desired to then generate a natural language model that categorizes the documents 305 into these newfound topics. Thus, after performing the topic modeling analysis 230, in some embodiments, the natural language model may also be generated at block 315.

Figure 4:
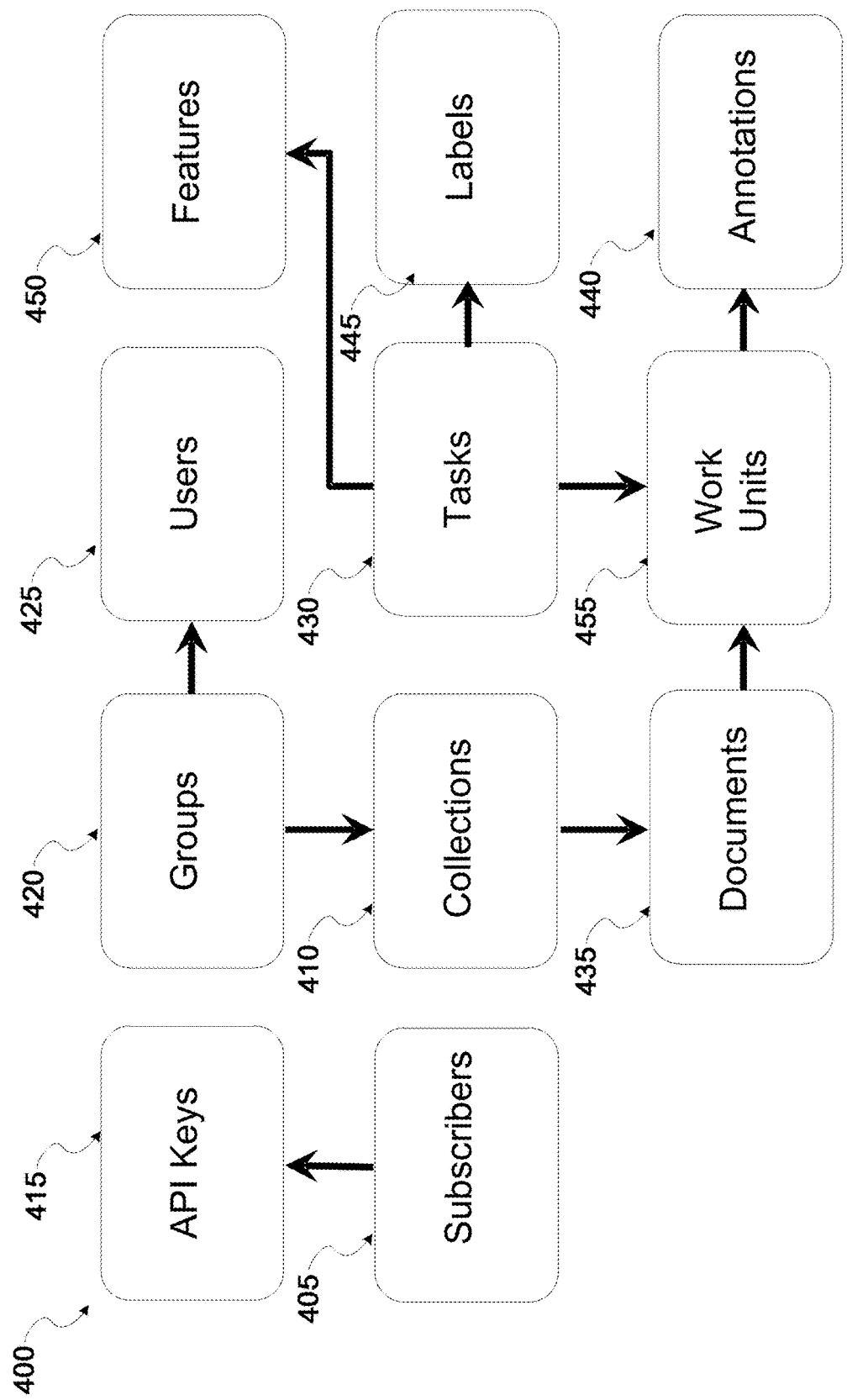
FIG. 4 is a diagram showing an example flowchart for how different data structures within the system architecture may be related to one another, according to some example embodiments.

Referring to FIG. 4, a diagram 400 is presented showing an example flowchart for how different data structures within the system architecture may be related to one another, according to some example embodiments. Here, the collections data structure 410 represents a set of documents 435 that in some cases may generally be homogenous. A document 435 represents a human communication expressed in a single discrete package, such as a single tweet, a webpage, a chapter of a book, a command to a device, or a journal article, or any part thereof. Each collection 410 may have one or more tasks 430 associated with it. A task 430 may be thought of as a classification scheme. For example, a collection 410 of tweets may be classified by its sentiment, e.g. a positive sentiment or a negative sentiment, where each classification constitutes a task 430 about a collection 410. A label 445 refers to a specific prediction about a specific classification. For example, a label 445 may be the "positive sentiment" of a human communication, or the "negative sentiment" of a human communication. In some cases, labels 445 can be applied to merely portions of documents 435, such as paragraphs in an article or particular names or places mentioned in a document 435. For example, a label 445 may be a "positive opinion" expressed about a product mentioned in a human communication, or a "negative opinion" expressed about a product mentioned in a human communication. In some example embodiments, a task may be a sub-task of another task, allowing for a hierarchy or complex network of tasks. For example, if a task has a label of "positive opinion," there might be subtasks for types of "positives opinions," like "intention to purchase the product," "positive review," "recommendation to friend," and so on, and there may be subtasks that capture other relevant information, such as "positive features."

Annotations 440 refer to classifications imputed onto a collection 410 or a document 435, often times by human input but may also be added by programmatic means, such as interpolating from available metadata (e.g., customer value, geographic location, etc.), generated by a pre-existing natural language model, or generated by a topic modeling process. As an example, an annotation 440 applies a label 445 manually to a document 435. In other cases, annotations 440 are provided by users 235 from pre-existing data. In other cases, annotations 440 may be derived from human critiques of one or more documents 435, where the computer determines what annotation 440 should be placed on a document 435 (or collection 410) based on the human critique. In other cases, with enough data in a language model, annotations 440 of a collection 410 can be derived from one or more patterns of pre-existing annotations found in the collection 410 or a similar collection 410.

In some example embodiments, features 450 refer to a library or collection of certain key words or groups of words that may be used to determine whether a task 430 should be associated with a collection 410 or document 435. Thus, each task 430 has associated with it one or more features 450 that help define the task 430. In some example embodiments, features 450 can also include a length of words or other linguistic descriptions about the language structure of a document 435, in order to define the task 430. For example, classifying a document 435 as being a legal document may be based on determining if the document 435 contains a threshold number of words with particularly long lengths, words belonging to a pre-defined dictionary of legal-terms, or words that are related through syntactic structures and semantic relationships. In some example embodiments, features 450 are defined by code, while in other cases features 450 are discovered by statistical methods. In some example embodiments, features 450 are treated independently, while in other cases features 450 are networked combinations of simpler features that are used in combination utilizing techniques like "deep-learning." In some example embodiments, combinations of the methods described herein may be used to define the features 450, and embodiments are not so limited. One or more processors may be used to identify in a document 435 the words found in features data structure 450 to determine what task should be associated with the document 435.

In some example embodiments, a work unit's data structure 455 specifies when humans should be tasked to further examine a document 425. Thus, human annotations may be applied to a document 435 after one or more work units 455 is applied to the document 435. The work units 455 may specify how many human annotators should examine the document 435 and in what order of documents should document 435 be examined. In some example embodiments, work units 455 may also determine what annotations should be reviewed in a particular document 435 and what the optimal user interface should be for review.

In some example embodiments, the data structures 405, 415, 420 and 425 represent data groupings related to user authentication and user access to data in system architecture. For example, the subscribers block 405 may represent users and associated identification information about the users. The subscribers 405 may have associated API keys 415, which may represent one or more authentication data structures used to authenticate subscribers and provide access to the collections 410. Groups 420 may represent a grouping of subscribers based on one or more common traits, such as subscribers 405 belonging to the same company. Individual users 425 capable of accessing the collections 410 may also result from one or more groups 420. In addition, in some cases, each group 420, user 425, or subscriber 405 may have associated with it a more personalized or customized set of collections 510, documents 435, annotations 440, tasks, 430, features 450, and labels 445, based on the specific needs of the customer.

Aspects of the present disclosure allow for a trained natural language model to be stored in an efficient manner such that the trained natural language model may be utilized in virtually any computing device. Unlike other natural language processing engines that may be computationally intensive to the point of being capable of running only on high performance machines, the organization of the natural language models according to the present disclosures allow for natural language processing to be performed even on smaller devices, such as mobile devices.

In some embodiments, the flexible portability of the trained natural language model is based at least in part on an efficient organization for storing the trained learning data of a model. In some embodiments, the efficiently organized data file is called a "ZIF," and may include a table of linguistic features and associated predictive probabilities for each feature. Multiple ZIFs may be generated and used to comprise a natural language model.

Figure 5:
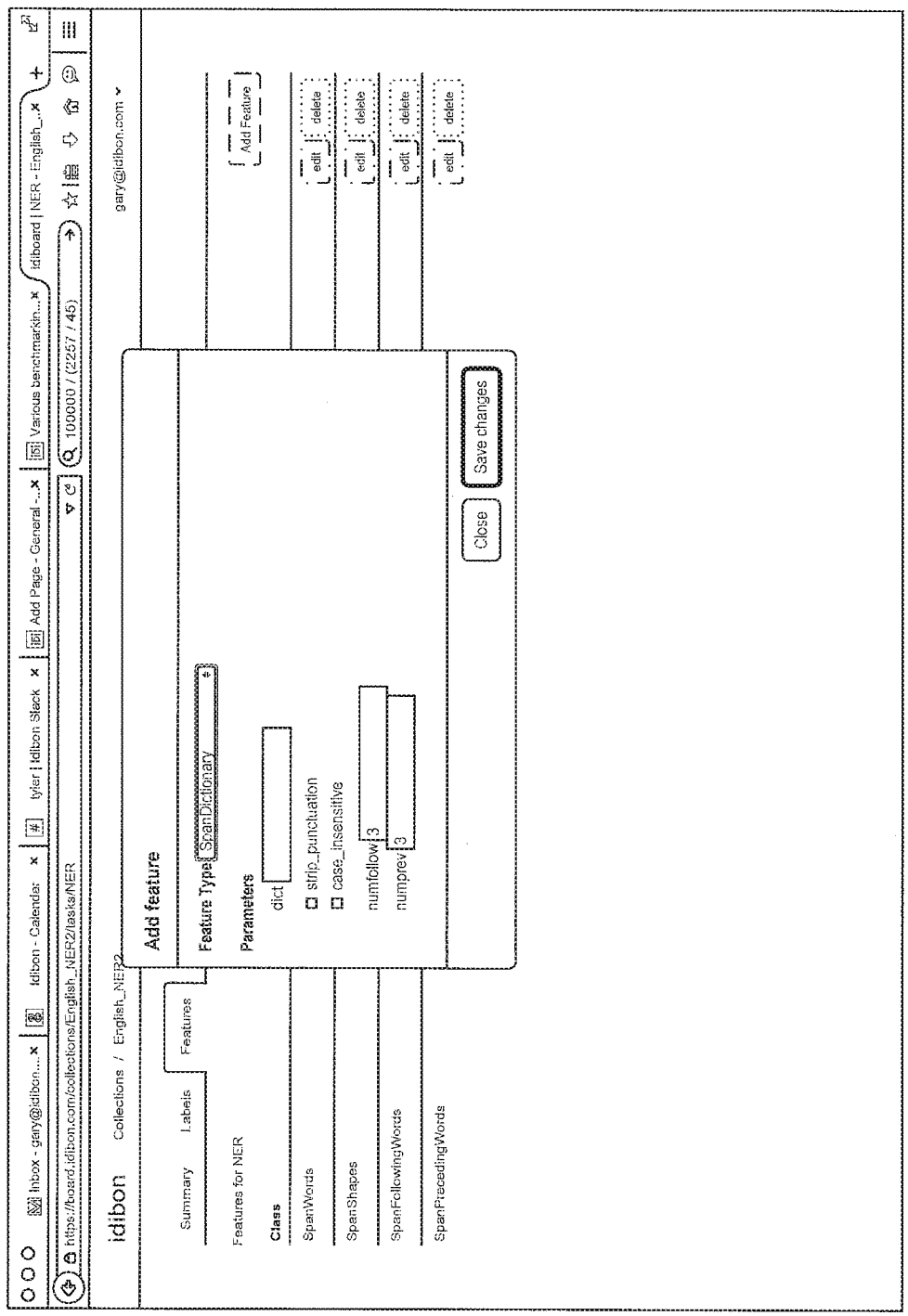
FIG. 5 shows an example display for adding a feature type to a natural language training model, according to some embodiments.
Figure 7:
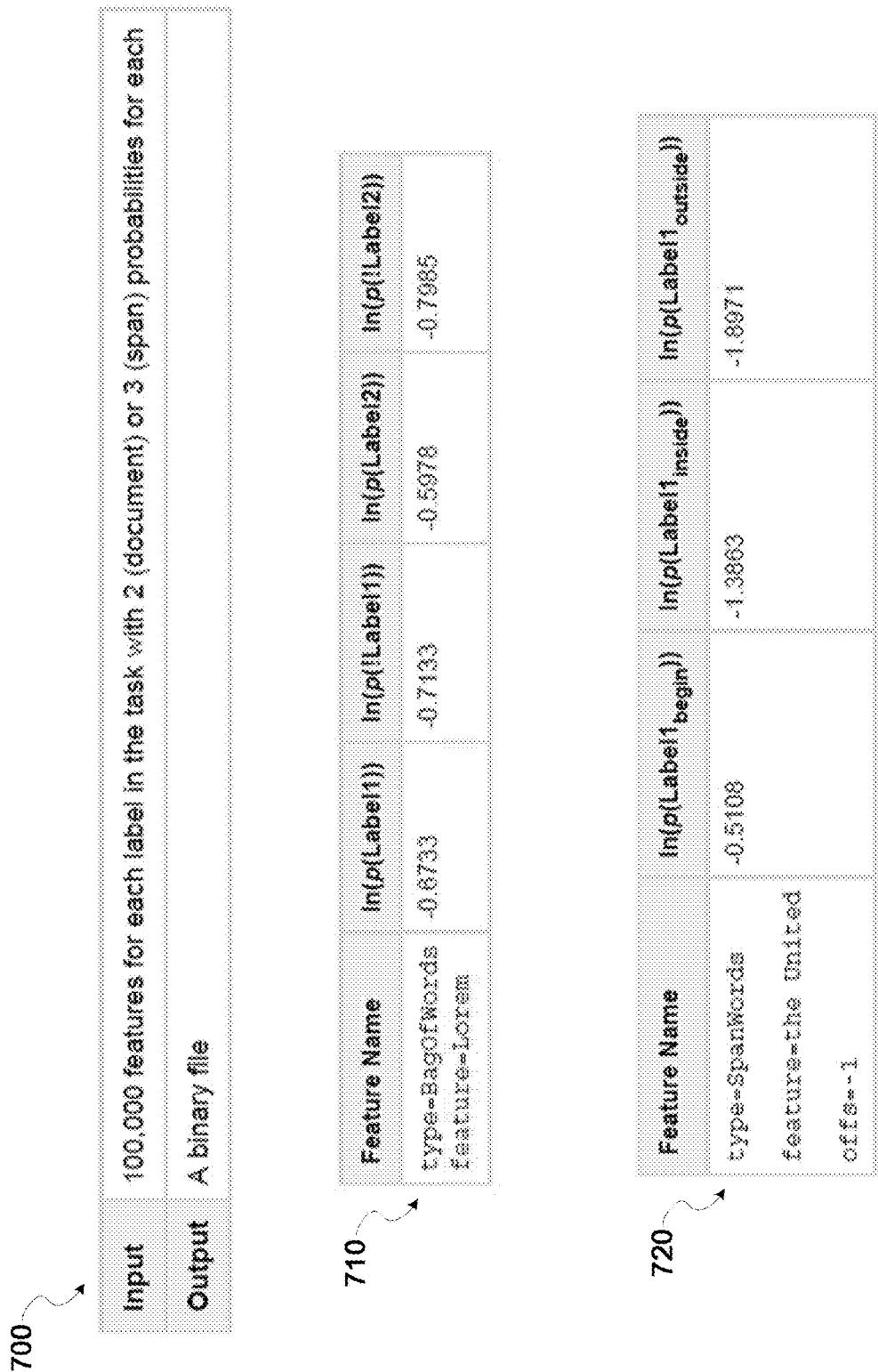
FIG. 7 shows examples of information pertaining to the efficient storage of a natural language model in a ZIF file, according to some embodiments.

As used herein, a feature type is a data structure responsible for taking a tokenized sequence of document text and generating linguistic features from the content. Aspects of the present disclosure include an extensible system for defining feature types and parameters for each (e.g., case sensitivity), and project administrators are able to choose appropriate feature types for their tasks in an associated graphical user interface for conducting the model training. An example interface for adding a feature is shown in FIG. 5.

In some embodiments, a standard set of feature types are assigned by the system based on properties of the document training data, such as the length of the text or the language used. Additionally, "deep-learning" techniques may be used to further optimize the assigned feature types.

Referring to FIG. 6, illustration 600 shows a chart of some example feature types, according to some embodiments. Each of the features may be applied to a particular type of tasks, as described in the "Valid Tasks" column. Example parameters needed for utilizing the various feature types are described in the "Parameters" column.

An example process of converting a document to a set of features is illustrated in example flow diagram 610. Shown here is the application of the NGrams feature with parameters of size=2, strip_punctuation=false and case_insensitive=false.

In some embodiments, the ZIF file stores a natural language model for task 430 within a table that associates, for each feature among a plurality of features generated using a process like that shown in flow diagram 610, one or more probabilities associated with a label among a plurality of labels. Each of these different probabilities has a different meaning, examples of some of which are described more below, but in general the natural language platform is configured to interpret the meaning of each probability given its location in a row and column of a table in the ZIF file. The probabilities are calculated by a model training process such as included in the background processing module 220 of FIG. 2. In some embodiments, the ZIF file stores either 2 or 3 probabilities for each generated feature for each of the labels 445, depending on whether task 430 is a document-scope or span-scope task, respectively. In some embodiments, the ZIF may be restricted to store a maximum number of feature probabilities for each label (for example, 100,000), and a feature selection process performed during model training may decide which features should be included in the ZIF. In such embodiments, the ZIF may store 0 probabilities for specific features and labels, if the feature selection process discards that feature.

In some embodiments, the ZIF file stores the logarithms of each probability, rather than the exact probability value. An example of this table is described below. Using the logarithms improves run-time prediction speed by using addition and subtraction operations to combine the probabilities for multiple features, rather than multiplication and division. The addition and subtraction operations are less computationally intensive and therefore more efficient.

For document tasks, this table will be organized like a spreadsheet with 1 column for the feature, and 2 columns for each label (e.g., corresponding to the probability that the feature predicts the presence or absence of a label, respectively). An example row of this table is shown in illustration 710. As shown, the row of feature "Lorem" in the "BagofWords" feature type has probabilities for the presence and absence of "Label1" and "Label2" in the respective columns, stored in a logarithmic scale for better efficiency.

For span tasks, the table will be organized to have 1 column for the feature, and 3 columns for each label (e.g., corresponding to the probability that the feature appears at the beginning, inside, or outside a span, respectively). An example row of this type is shown in illustration 720. As shown, the row of the feature "the United" in the feature type "SpanWords" with an offset of −1 has probabilities that the feature appears at the beginning, inside, and outside of a span of "Label1" in the respective columns, stored in a logarithmic scale for better efficiency.

To conserve space, in some embodiments, the tables are stored using 2 arrays of 16-bit numbers for every feature row. A first array stores the integer indices of every label with non-zero probability. This allows the ZIF to store sparse models efficiently, since features that are not selected in Step 3 for the label do not consume any space on-disk. A second array stores a quantized 16-bit fixed-point value of the log-probability. In conventional systems, weights would be stored as 32-bit or 64-bit floating-point values. This is inefficient, since probabilistic values are between 0 . . . 1, and a 32-bit floating point number represents −2127 . . . 2126, so a substantial amount of space is wasted on values that would never be used (a 64-bit floating point number is even more extreme). Additionally, conventional floating point encodings use a sign-exponent-mantissa format which distributes numerical accuracy logarithmically throughout the range, with values closer to zero receiving a proportionally higher percentage of available encodings than larger values. One additional advantage to storing the logarithms of the probabilities in the ZIF file is that the logarithmic transform provides a similar distribution of encodings to raw values as using a conventional floating-point format. Therefore, 16-bits of precision, logarithmically distributed for probabilities between 0 . . . 1 may be sufficient and provide more memory efficiency.

ZIF files also contain the Task configuration data that existed when the model was trained, in some embodiments. This includes (a) the feature types that were used and parameters configured for each, and (b) any analyst-defined tuning rules. Descriptions of these data are below, according to some embodiments.

In some embodiments, tuning dictionaries are stored within a ZIF using Javascript Object Notation (JSON) encoding. Tuning dictionaries are represented as dictionaries of phrases and corresponding rule weights for each label in the task. Dictionaries may be empty if no rules are defined for that label. Shown below is an example storage format for rules with weights. Here for example, if a document contains the word "router" or "connectivity," it will be highly likely to be classified as belonging to the Broadband classification. As described below, the weight (e.g., 0.8) influences weights assigned by machine learning.

```
"Broadband": {
    "/(?i)broad.?band/": 0.9,
    "/(?i)router|connectivity/": 0.8,
    "/(?i)wire.?less|wi.?fi/": 0.8
},
"On demand": {
    "/(?i)4od/": 0.9,
```

In some embodiments, enabled feature types and parameters configured for each are stored within a ZIF using JSON encoding. According to these embodiments, the names and parameters for enabled features may be stored as an array of dictionaries, with each dictionary containing entries for both the enabled feature type name and its associated configuration parameters. Below is an example of how this aspect may be organized.

```
"features": [
    {
        "name": "BagOfWords",
        "parameters": {
            "case_insensitive": "false",
            "strip_punctuation": "false"
        },
    },
    {
        "name": "NGrams",
        "parameters": {
            "case_insensitive": "true",
            "size": "3",
            "strip_punctuation": "true"
        },
    }
]
```

Additionally, in some embodiments, the inclusion of feature configuration and rules within the binary model data ensures that all of the configuration information needed to apply a model to text is contained within the model file itself.

In some embodiments, ZIF files may also include inter-document statistical data as used by the enabled feature types. For example, a feature type that designates documents as being longer or shorter than a median document length for the document set may store the computed median document length statistic within the same structure used to store feature parameter configuration.

In some embodiments, the set of supported feature types is defined by a centralized API server, and the list of feature types, including each name and parameters supported therein are defined by this central authority. Applying the natural language model defined according to these embodiments requires that the software which reads the ZIF file provide an environment in which all feature types referenced by the model are implemented accordingly.

In tightly embedded environments, coupling of the model to the software environment may be undesirable, necessitating expensive software updates. To decouple this, in some embodiments, the ZIF file may include executable code that performs a user-specified data transformation to generate custom features. This executable code may be used instead of, or in addition to, other supported feature types. Such transformations may be developed in a standard language (like JavaScript, or Lua) that has been broadly ported across a number of platforms. In such embodiments, the software reading the ZIF file may provide a much more limited set of services, for example only providing tokenization and a suitable execution engine for the provided transformation. In such embodiments, code written in a portable scripting language may be stored within the same JSON array used to store other enabled feature type names and associated parameters.

Unlike conventional methods of storing features, whereby typically a natural language platform may provide only a fixed set of feature types (e.g., having a "central authority" define all available feature types), providing executable code in the ZIF file to perform user-specified data transformations allows for new features to be developed and resolves tedious inconsistencies between different software versions of the natural language model stored in the ZIF. For example, if a model is trained using a new version of software that includes a new feature type that was not present in an older software version, allowing feature types to be defined as executable code embedded within the model data may eliminate these compatibility problems. Furthermore, this may also allow for much faster development and utilization of new feature types, due to being able to train and apply models incorporating the new feature types without redeploying the platform through, e.g., a new software version.

One advantage to storing all necessary configuration data within the ZIF file is that application of the natural language model is self-contained; no external state is necessary to apply the natural language model stored in a ZIF file to unprocessed text. Once the ZIF file(s) containing the language model is generated, a device even with low processing power and memory may be able to utilize the model stored within the ZIF. For example, whenever a client application makes a request to classify (or extract spans) from some document text, a software application utilizing the ZIF file may perform the following operations according to some embodiments:

1. Load and cache the ZIF model for the task (if not already loaded)
2. Tokenize the document
3. Generate features according to the feature types and parameters defined in the task configuration data
4. Compute the odds for each label by applying the equation (1) as shown to the document features, using the log-probabilities stored in the ZIF $$p_{ml}^{label} = e^{\Sigma_{f \in features} p(f|label) - p(f|!label)} \quad (1)$$

5. If any rules are defined, compute a rule-based prediction using the equation (2) as shown, given the weights, $w_r$, for each rule and number of times the rule matches text within the document, count(r, document):

$$p_{rule}^{label} = \frac{\Sigma_{r \in rules} w_r \cdot \text{count}(r, \text{document})}{\Sigma_{r \in rules} \text{count}(r, \text{document})} \quad (2)$$

6. The final confidence for the prediction in each label is a weighted-average of $p_{ml}$ and $p_{rule}$. The weights are the number of features found in the ZIF and the number of matching rules, respectively.

A similar process may be applied to classify regions of text within documents, such as identifying company and location names, as the one described for classification of entire documents, according to some embodiments. In addition, further statistical considerations may be applied to span-specific contexts. For example, a feature type specific to spans may include additional rules, such as "string x is more likely to be label y if it appears in the first part of the document." This type of analysis may also be programmed and included in the ZIF data.

In some embodiments, various data structures for storing content of a ZIF may also improve efficiency. For example, some ZIF files are organized like spreadsheets, with every feature stored in its entirety along with a row of probabilities for it. However, many features are substrings of each other (for example, the bigram "the United" is an exact substring of the trigram "the United States"). As the text in features gets longer, the proportion of storage space consumed by the feature text increases relative to the overall model size.

This suggests that an alternate data structure, such as a trie or other hierarchical structure, may be a better way to store ZIFs to improve F-measure/byte. In some embodiments, these data structures may be used to improve efficiency.

Figure 8:
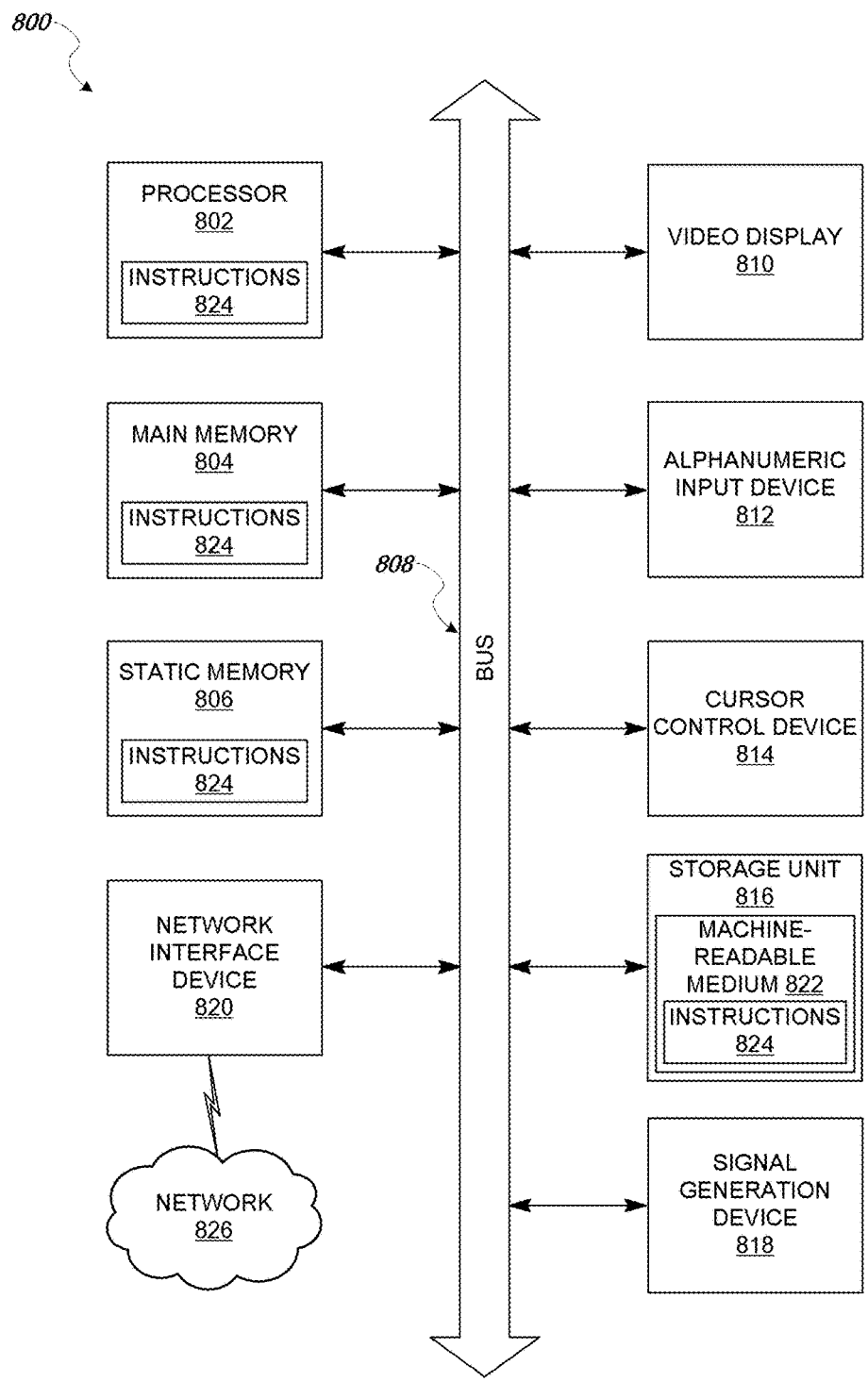
FIG. 8 is a block diagram illustrating components of a machine, according to some example embodiments, able to read instructions from a machine-readable medium and perform any one or more of the methodologies discussed herein.

Referring to FIG. 8, the block diagram illustrates components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part.

In alternative embodiments, the machine 800 operates as a standalone device or may be connected (e.g., networked) to other machines. In a networked deployment, the machine 800 may operate in the capacity of a server machine 110 or a client machine in a server-client network environment, or as a peer machine in a distributed (e.g., peer-to-peer) network environment. The machine 800 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine 800 is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a video display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein, including, for example, any of the descriptions of FIGS. 1-7. The instructions 824 may also reside, completely or at least partially, within the main memory 804, within the processor 802 (e.g., within the processor's cache memory), or both, before or during execution thereof by the machine 800. The instructions 824 may also reside in the static memory 806.

Accordingly, the main memory 804 and the processor 802 may be considered machine-readable media 822 (e.g., tangible and non-transitory machine-readable media). The instructions 824 may be transmitted or received over a network 826 via the network interface device 820. For example, the network interface device 820 may communicate the instructions 824 using any one or more transfer protocols (e.g., HTTP). The machine 800 may also represent example means for performing any of the functions described herein, including the processes described in FIGS. 1-7.

In some example embodiments, the machine 800 may be a portable computing device, such as a smart phone or tablet computer, and have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 822 able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database 115, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device 120 or 130, as well as cloud-based storage systems or storage networks that include multiple storage apparatus or devices 120 or 130. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium 822 is non-transitory in that it does not embody a propagating signal. However, labeling the tangible machine-readable medium 822 as "non-transitory" should not be construed to mean that the medium is incapable of movement; the medium should be considered as being transportable from one physical location to another. Additionally, since the machine-readable medium 822 is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 822 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 802 or other programmable processor 802. It will be appreciated that the decision to implement a hardware module mechanically, in dedicated and permanently configured circuitry, or in temporarily configured circuitry (e.g., configured by software) may be driven by cost and time considerations.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 808) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions described herein. As used herein, "processor-implemented module" refers to a hardware module implemented using one or more processors 802.

Similarly, the methods described herein may be at least partially processor-implemented, a processor 802 being an example of hardware. For example, at least some of the operations of a method may be performed by one or more processors 802 or processor-implemented modules. As used herein, "processor-implemented module" refers to a hardware module in which the hardware includes one or more processors 802. Moreover, the one or more processors 802 may also operate to support performance of the relevant operations in a "cloud computing" environment or as a "software as a service" (SaaS). For example, at least some of the operations may be performed by a group of computers (as examples of machines 800 including processors 802), with these operations being accessible via a network 826 (e.g., the Internet) and via one or more appropriate interfaces (e.g., an API).

The performance of certain operations may be distributed among the one or more processors 802, not only residing within a single machine 800, but deployed across a number of machines 800. In some example embodiments, the one or more processors 802 or processor-implemented modules may be located in a single geographic location (e.g., within a home environment, an office environment, or a server farm). In other example embodiments, the one or more processors 802 or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine 800 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The present disclosure is illustrative and not limiting. Further modifications will be apparent to one skilled in the art in light of this disclosure and are intended to fall within the scope of the appended claims.

What is claimed is:

1. A method for classifying a document in natural language processing using a natural language model stored in one or more data files, the method comprising:
accessing, by a processor in a natural language processing platform using the natural language model, one or more feature types from the one or more data files, the one or more feature types each defining a data structure configured to access a tokenized sequence of the document and generate linguistic features from content within the tokenized sequence;
performing, by the processor in the natural language processing platform, a tokenizing operation of the document, the tokenizing operation configured to generate one or more tokenized sequences from the content within the document;
generating, by the processor in the natural language processing platform, a plurality of features for the document from the one or more tokenized sequences, based on parameters defined by the one or more feature types and on parameters defined in task configuration data in the one or more data files, the task configuration data associated with a type of task analysis that the natural language model is configured to classify the document into;
accessing, by the processor in the natural language processing platform, a plurality of probabilities stored in the one or more data files, each probability among the plurality of probabilities associated with a feature among the plurality of features and defining a pre-computed likelihood that said feature predicts a presence or absence of a label that the document is to be classified into;
wherein:
the plurality of probabilities are pre-computed during a model training process configured to train the natural language model to classify documents according to at least said label and said task analysis;
the one or more data files is configured to store each probability in a logarithmic scale that is converted to said probability by the processor;
the one or more data files is configured to store a table of rows and columns, wherein a first column comprises the plurality of features, a second column comprises a first category of probabilities among the plurality of probabilities that describes a first likelihood that a feature in the first column belonging to the same row satisfies a first attribute of said label, and a third column comprises a second category of probabilities among the plurality of probabilities that describes a second likelihood that said feature in the first column belonging to the same row satisfies a second attribute of said label; and the first attribute of said label represents a likelihood that said feature in the same row appears at a beginning of a span of the document, the second attribute of said label represents a likelihood that said feature in the same row appears inside said span of the document, and a fourth column comprises a third category of probabilities among the plurality of probabilities that represents a third likelihood that said feature in the same row appears outside said span of the document;

computing, by the processor in the natural language processing platform, a prediction score indicating how likely the document is to be classified into said label, based on the plurality of probabilities;

classifying, by the processor in the natural language processing platform, the document into said label based on comparing the prediction score to a threshold; and training the natural language model at least based on the classified document.

2. The method of claim 1, wherein the plurality of probabilities comprise a first probability that said feature predicts the presence of said label and a second probability that said feature predicts the absence of said label.

3. The method of claim 1, wherein the plurality of probabilities comprise a first probability that said feature appears at a beginning of a subset of the document, a second probability that said feature appears at an inside of the subset of the document, and a third probability that said feature appears on an outside of the subset of the document.

4. The method of claim 1, wherein each feature among the generated plurality of Features comprises a first array storing integer indices of every label in the natural language model having a non-zero probability.

5. The method of claim 4, wherein each feature among the generated plurality of Features further comprises a second array storing a quantized 16-bit fixed-point value of each probability converted as a logarithm.

6. The method of claim 1, wherein generating the plurality of features is based further on task configuration data stored in the one or more data files, the task configuration data including training feature types used to train the natural language model.

7. The method of claim 6, wherein the task configuration data stored in the one or more data files includes executable code configured perform a user-specified data transformation to generate custom feature types.

8. The method of claim 1, wherein the task configuration data further comprises analyst-defined tuning rules.

9. The method of claim 1, wherein the first attribute of said label represents a likelihood that said label is present in said feature belonging to the same row, and the second attribute of said label represents a likelihood that said label is absent in said feature belonging to the same row.

10. A natural language platform configured to classify a document in natural language processing using a natural language model stored in one or more data files, the natural language platform comprising:

a memory configured to store the one or more data files; and a processor coupled to the memory and configured to:

access one or more feature types from the one or more data files, the one or more feature types each defining a data structure configured to access a tokenized sequence of the document and generate linguistic features from content within the tokenized sequence;

perform a tokenizing operation of the document, the tokenizing operation configured to generate one or more tokenized sequences from the content within the document;

generate a plurality of features for the document from the one or more tokenized sequences, based on parameters defined by the one or more feature types and on parameters defined in task configuration data in the one or more data files, the task configuration data associated with a type of task analysis that the natural language model is configured to classify the document into;

access a plurality of probabilities stored in the one or more data files, each probability among the plurality of probabilities associated with a feature among the plurality of features and defining a pre-computed likelihood that said feature predicts a presence or absence of a label that the document is to be classified into;

wherein:

the plurality of probabilities are pre-computed during a model training process configured to train the natural language model to classify documents according to at least said label and said task analysis;

the one or more data files is configured to store each probability in a logarithmic scale that is converted to said probability by the processor;

the one or more data files is configured to store a table of rows and columns, wherein a first column comprises the plurality of features, a second column comprises a first category of probabilities among the plurality of probabilities that describes a first likelihood that a feature in the first column belonging to the same row satisfies a first attribute of said label, and a third column comprises a second category of probabilities among the plurality of probabilities that describes a second likelihood that said feature in the first column belonging to the same row satisfies a second attribute of said label; and the first attribute of said label represents a likelihood that said feature in the same row appears at a beginning of a span of the document, the second attribute of said label represents a likelihood that said feature in the same row appears inside said span of the document, and a fourth column comprises a third category of probabilities among the plurality of probabilities that represents a third likelihood that said feature in the same row appears outside said span of the document;

compute a prediction score indicating how likely the document is to be classified into said label, based on the plurality or probabilities;

classify the document into said label based on comparing the prediction score to a threshold; and train the natural language model at least based on the classified document.

11. The natural language platform of claim 10, wherein the plurality of probabilities comprise a first probability that said feature predicts the presence of said label and a second probability that said feature predicts the absence of said label.

12. The natural language platform of claim 10, wherein the plurality of probabilities comprise a first probability that said feature appears at a beginning of a subset or the document, a second probability that said feature appears at an inside of the subset of the document, and a third probability that said feature appears on an outside of the subset or the document.

13. The natural language platform of claim 10, wherein each feature among the generated plurality of features comprises a first array storing integer indices of every label in the natural language model having a non-zero probability.

14. The natural language platform of claim 13, wherein each feature among the generated plurality of features further comprises a second array storing a quantized 16-bit fixed-point value of each probability converted as a logarithm.

15. The natural language platform of claim 10, wherein the first attribute of said label represents a likelihood that said label is present in said feature belonging to the same row, and the second attribute of said label represents a likelihood that said label is absent in said feature belonging to the same row.

16. A non-transitory computer-readable medium embodying instructions that, when executed by a processor, perform operations comprising:
  accessing one or more feature types from a data file storing a natural language model, the one or more Feature types each defining a data structure configured to access a tokenized sequence of the document and generate linguistic features from content within the tokenized sequence;
  performing a tokenizing operation of the document, the tokenizing operation configured to generate one or more tokenized sequences from the content within the document;
  generating a plurality of features for the document from the one or more tokenized sequences, based on parameters defined by the one or more feature types and on parameters defined in task configuration data in the data file, the task configuration data associated with a type of task analysis that the natural language model is configured to classify the document into;
  accessing a plurality of probabilities stored in the data file, each probability among the plurality of probabilities associated with a feature among the plurality of features and defining a pre-computed likelihood that said feature predicts a presence or absence of a label that the document is to be classified into;

wherein:
  the plurality of probabilities are pre-computed during a model training process configured to train the natural language model to classify documents according to at least said label and said task analysis;
  the data file is configured to store each probability in a logarithmic scale that is converted to said probability by the processor;
  the data file is configured to store a table of rows and columns, wherein a first column comprises the plurality of features, a second column comprises a first category of probabilities among the plurality of probabilities that describes a first likelihood that a feature in the first column belonging to the same row satisfies a First attribute of said label, and a third column comprises a second category of probabilities among the plurality of probabilities that describes a second likelihood that said feature in the first column belonging to the same row satisfies a second attribute of said label; and
  the first attribute of said label represents a likelihood that said feature in the same row appears at a beginning of a span of the document, the second attribute of said label represents a likelihood that said feature in the same row appears inside said span of the document, and a fourth column comprises a third category of probabilities among the plurality of probabilities that represents a third likelihood that said feature in the same row appears outside said span of the document:
  computing a prediction score indicating how likely the document is to be classified into said label, based on the plurality of probabilities;
  classifying the document into said label based on comparing the prediction score to a threshold; and
  training the natural language model at least based on the classified document.

17. The computer-readable medium of claim 16, wherein the first attribute of said label represents a likelihood that said label is present in said feature belonging to the same row, and the second attribute of said label represents a likelihood that said label is absent in said feature belonging to the same row.

* * * * *

UNITED STATES PATENT AND TRADEMARK OFFICE
CERTIFICATE OF CORRECTION

PATENT NO. : 9,836,450 B2
APPLICATION NO. : 14/964526
DATED : December 5, 2017
INVENTOR(S) : Schuyler D. Erle et al.

It is certified that error appears in the above-identified patent and that said Letters Patent is hereby corrected as shown below:

On the Title Page

Column 1, remove "(73) Assignee: Sansa AI Inc., San Francisco, CA (US)".

Signed and Sealed this
Second Day of August, 2022

Katherine Kelly Vidal
*Director of the United States Patent and Trademark Office*